W. HESTON.
Whiffletree Hook.

No. 202,437. Patented April 16, 1878.

Witnesses.
George F. Robinson
J. H. Russel

Inventor
William Heston
by Bradford Howland
his Attorney

UNITED STATES PATENT OFFICE.

WILLIAM HESTON, OF AKRON, OHIO.

IMPROVEMENT IN WHIFFLETREE-HOOKS.

Specification forming part of Letters Patent No. 202,437, dated April 16, 1878; application filed May 19, 1877.

*To all whom it may concern:*

Be it known that I, WILLIAM HESTON, of Akron, Summit county, Ohio, have invented a new and useful Improvement in Whiffletrees, which improvement is fully set forth in the following specification, reference being had to the accompanying drawings.

The object of my invention is to give the necessary reciprocating motion to each trace of a harness by means of a lever, to the long arm of which the trace is hitched, the lever being actuated by a rubber spring in contact with its short arm.

Figure 1:
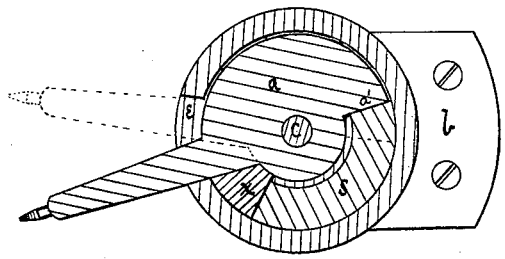
Figure 2:
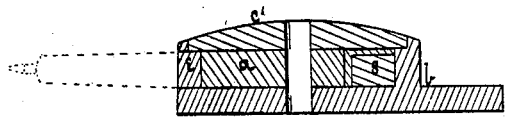

Figure 1 is a horizontal section. Fig. 2 is a vertical section.

The box $b$ is firmly attached to the thills of a carriage, so that lever $a$ will be in a proper position for the trace to be hitched to the outer end of its long arm. The lever turns on a bolt, $c$, which passes through the lever, box $b$ and its cover $c'$, and the thills. The long arm of the lever projects through a horizontal slot, $e$, in the side of box $b$, in which lever $a$ oscillates when the draft is applied.

The interior of box $b$ is circular. Each side of lever $a$ within box $b$ is the arc of a circle whose center is the pivot of the lever, the arc on one side being in contact with the interior circumference of box $b$, and a space or recess being left between the other arc and the interior circumference of box $b$, so that the ends of the recess are formed by the two arms of lever $a$. The end of this recess next to the long arm of lever $a$ is filled by the abutment $x$, which is firmly attached to box $b$. The remainder of the recess is filled by the rubber spring $s$, except a narrow space between spring $s$ and the smaller arc of lever $a$, to allow compression of the spring.

The lever $a$ and abutment $x$ prevent mud and other extraneous substances from entering the recess occupied by spring $s$. Box $b$ is bolted to the thills through the flange of the box, as well as by the lever bolt or pivot $c$.

When draft is applied to the long arm of lever $a$ its short arm $a'$ compresses spring $s$ against abutment $x$, and lever $a$ moves toward the position shown by dotted lines in Fig. 1. When the tension is relaxed, the long arm of lever $a$ is moved back by the force of spring $s$.

Two of the boxes and levers are used, one for each trace, and when the vehicle to which they are attached is in use the levers oscillate similarly to the ends of an ordinary whiffletree.

I claim as my invention—

The lever $a$, fitted at its outer end to hold a harness-trace, and having the short arm $a'$, in combination with the rubber spring $s$, pivot $c$, and box $b$, having the abutment $x$ at one end of slot $e$, the lever $a$ being fitted to turn in contact with abutment $x$ and the interior of box $b$, substantially as described.

WILLIAM HESTON.

Witnesses:
   GEO. F. ROBINSON,
   BRADFORD HOWLAND.